(12) United States Patent
Kim et al.

(10) Patent No.: US 7,020,733 B2
(45) Date of Patent: Mar. 28, 2006

(54) DATA BUS SYSTEM AND METHOD FOR PERFORMING CROSS-ACCESS BETWEEN BUSES

(75) Inventors: Jae-Hun Kim, Yongin (KR); Woo-Hyuk Jang, Suwon (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 239 days.

(21) Appl. No.: 10/680,192

(22) Filed: Oct. 8, 2003

(65) Prior Publication Data

US 2005/0021896 A1  Jan. 27, 2005

(30) Foreign Application Priority Data

Oct. 9, 2002  (KR) ............... 10-2002-0061515
Jun. 23, 2003  (KR) ............... 10-2003-0040772

(51) Int. Cl.
*G06F 13/36* (2006.01)

(52) U.S. Cl. ............... 710/309; 710/107; 710/110; 710/240; 710/306

(58) Field of Classification Search ........... 710/110, 710/108, 113, 119, 240, 306, 309, 317

See application file for complete search history.

(56) References Cited

U.S. PATENT DOCUMENTS

| | | | | |
|---|---|---|---|---|
| 5,506,972 A | * | 4/1996 | Heath et al. ............... 710/113 |
| 5,649,209 A | * | 7/1997 | Umetsu et al. ............. 710/266 |
| 5,717,873 A | * | 2/1998 | Rabe et al. ................. 710/110 |
| 6,260,093 B1 | * | 7/2001 | Gehman et al. ............ 710/309 |
| 6,347,352 B1 | * | 2/2002 | Jeddeloh et al. ........... 710/243 |
| 6,496,890 B1 | * | 12/2002 | Azevedo et al. ........... 710/110 |
| 6,633,944 B1 | * | 10/2003 | Holm et al. ............... 710/306 |
| 6,775,732 B1 | * | 8/2004 | Jahnke et al. .............. 710/306 |
| 2001/0049760 A1 | * | 12/2001 | Delchini ..................... 710/110 |
| 2004/0044813 A1 | * | 3/2004 | Moss ........................... 710/110 |

FOREIGN PATENT DOCUMENTS

EP    730234 A2  *  9/1996

\* cited by examiner

*Primary Examiner*—Rehana Perveen
*Assistant Examiner*—Brian Misiura
(74) *Attorney, Agent, or Firm*—Harness, Dickey & Pierce, P.L.C.

(57) ABSTRACT

A data bus system, capable of distributing devices including first and second data buses capable of transmitting data among a plurality of devices; a register block that stores information on a first bus request signal and a first bus grant signal; a global arbiter that receives the first bus request signal from the register block to output a second bus request signal and receives a second bus grant signal from the register block to output the first bus grant signal. A bilateral bridge that acts as a data transmission path between the first data bus and the second data bus; and a local arbiter exists in each first and second data bus, and receives the second bus request signal from the global arbiter to output the second bus grant signal is disclosed.

20 Claims, 8 Drawing Sheets

DATA BUS SYSTEM AND METHOD FOR PERFORMING CROSS-ACCESS BETWEEN BUSES

This U.S. nonprovisional patent application claims priority under 35 U.S.C. § 119 of Korean Patent Applications 2002-61515 filed on Oct. 9, 2002, and 2003-40772 filed on Jun. 23, 2003, the entire contents of which are hereby incorporated by reference.

BACKGROUND OF THE INVENTION

1. Field of the Invention

Exemplary embodiments of the present invention relate to a data bus system and, more particularly, to an Advanced High-performance Bus (hereinafter referred to as "AHB") bus system having improved speed and performance that includes a number of AHB buses.

2. Description of the Related Art

Recently, ARM series processors are widely used as a CPU that includes an embedded system. A bus protocol that is widely used to implement a system with the ARM processor is an Advanced Micro-controller Bus Architecture (hereinafter, referred to as "AMBA") specified by ARM Inc. The AMBA includes an Advanced High-performance Bus for a high-speed device and an Advanced Peripheral Bus (hereinafter, referred to as "APB") for a low-speed device. The device, which is designed to have an interface operable to meet the AMBA specification, can be integrated into any system based on the AMBA. So far, a system implemented with the AMBA generally includes a single AHB and a single APB. In other words, the conventional AMBA system has one AHB which is connected with several master devices and slave devices. FIG. 1 illustrates a conventional AMBA having a single AHB bus system. Referring to FIG. 1, the structure of the conventional AMBA includes a Central Processing Unit (hereinafter, referred to as "CPU") 110, a Bus Arbiter 120, master devices 130, 140, 150 and slave devices 160, 170, 180 which are connected to the single AHB.

Although the conventional embedded system has shown sufficient performance even in the single AHB bus structure as illustrated above, as the embedded system has evolved to a System On Chip, which requires higher performance than the AHB bus system. More devices are connected on the system bus in the System On Chip than before, thus requiring higher performance. This higher performance requirement restricts implementation of the System On Chip with the current single AHB bus structure.

When several master and slave devices are connected to one AHB bus in the conventional AMBA, a bus overload problem may exist creating limitations on the improvement of an operational speed of the system. Moreover, when one master uses the bus in the conventional AMBA, the other master could not use the bus, so that a bus sharing problem may occur.

SUMMARY OF EXEMPLARY EMBODIMENTS OF THE INVENTION

Exemplary embodiments of the present invention provide an AHB bus system including a number of AHB buses to distribute devices connected on the system bus, thereby reducing the load on the bus to make the operational speed higher, and solving the bus sharing problem that may occur when a bus master, which transmits a large amount of data, uses the bus to improve the system efficiency.

A data bus system according to an exemplary embodiment of the present invention includes data buses to which a plurality of devices including at least one master are connected. Data can be transmitted among the plurality of devices, and the master can request and control the data transmission. A global arbiter can receive the bus request signals. At least one bilateral bridge may be provided that acts as a data transmission path. Lastly, a local arbiter may be provided in the data buses.

According to another exemplary embodiment of the present invention, there is a cross-access of data between the data buses.

According to yet another exemplary embodiment, a cross-access method between buses is provided.

DETAILED DESCRIPTION OF THE EXEMPLARY EMBODIMENTS

The AHB bus system according to an exemplary embodiment of the present invention will be described below with reference to the accompanying drawings.

Figure 1:
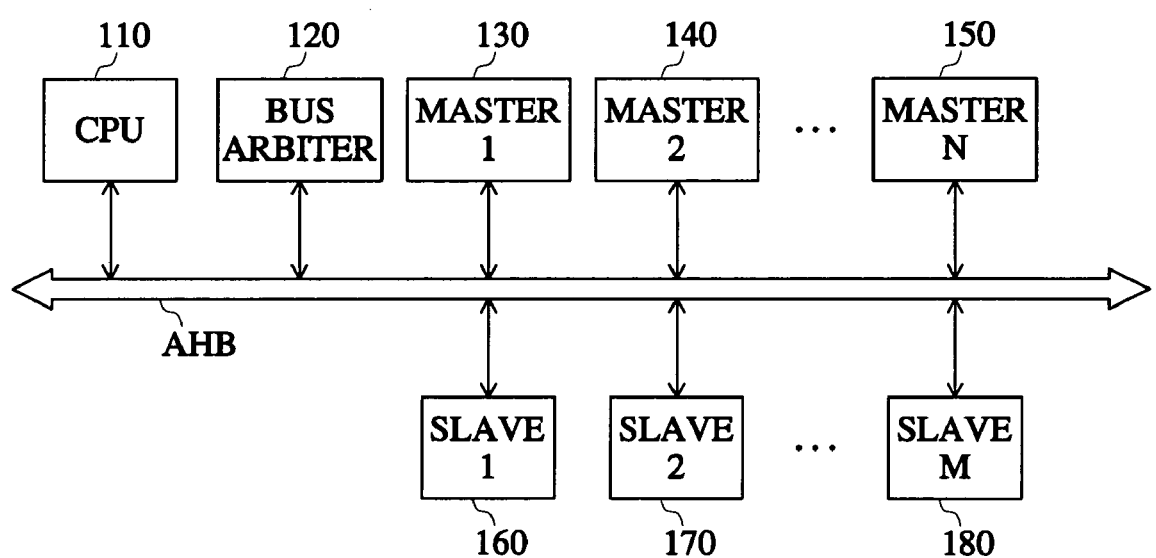
FIG. 1 is a block diagram illustrating a conventional AMBA having a single AHB bus system.
Figure 2:
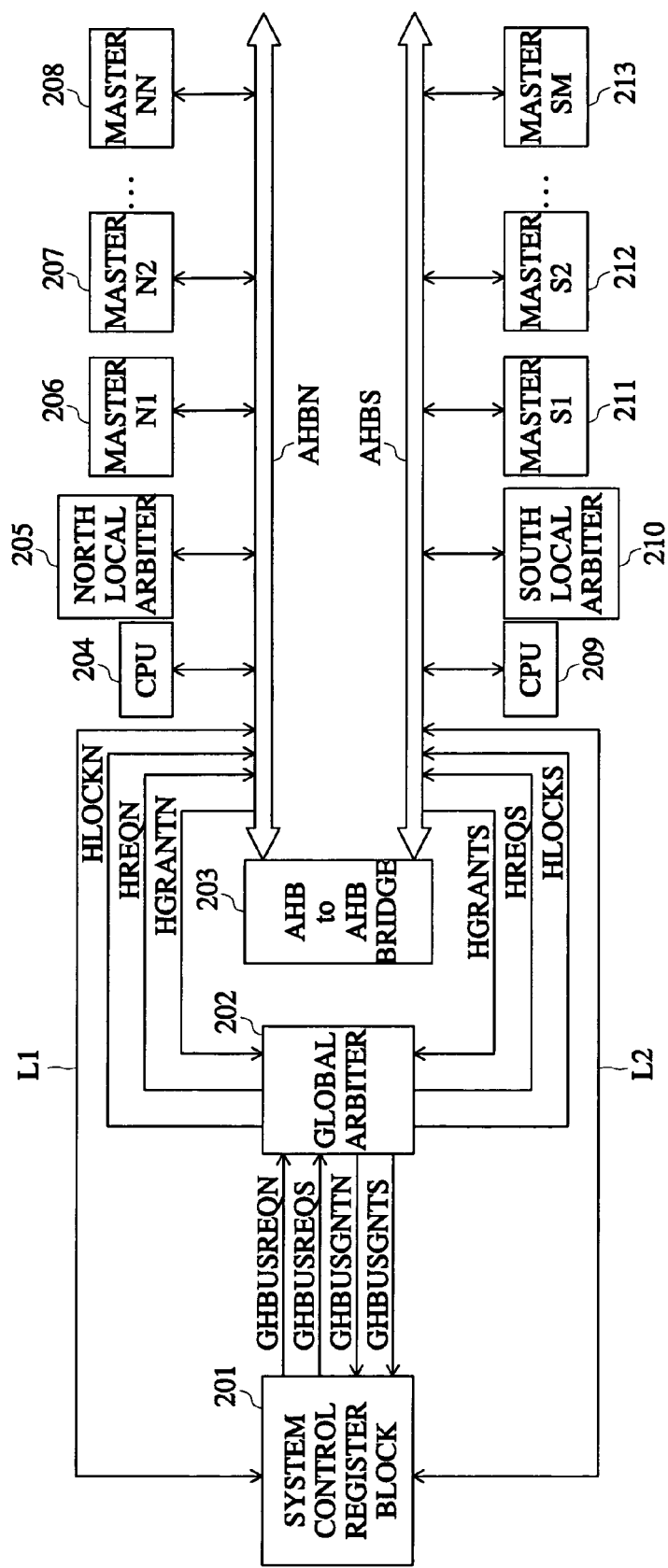
FIG. 2 is a simplified block diagram illustrating an AMBA having a dual AHB bus system in accordance with an exemplary embodiment of the present invention.

FIG. 2 is a block diagram illustrating an AMBA having a dual AHB bus system in accordance with an exemplary embodiment of the present invention.

The dual AHB bus system shown in FIG. 2 includes a first AHB bus (hereinafter, referred to as "AHBN"), a second AHB bus (hereinafter, referred to as "AHBS"), a system control register block 201, a global arbiter 202, a first CPU 204 connected to the AHBN, a first local arbiter 205 connected to the AHBN, master devices 206, 207, 208 connected to the AHBN, a second CPU 209 connected to the AHBS, a second local arbiter 210 connected to the AHBS, master devices 211, 212, 213 connected to the AHBS, and an AHB-to-AHB bus bridge 203 that functions as a bridge between the AHBN and the AHBS. In an exemplary embodiment, slave devices, which are not shown in FIG. 2, may optionally connected to the AHB buses. In FIG. 2, lines L1, L2 are used to send and receive addresses or data between the system control register block 201 and each bus AHBN, AHBS. The first CPU 204 connected to the AHBN and the second CPU 209 connected to the AHBS can, optionally, be master devices.

The operation of the data bus system according to an exemplary embodiment of the present invention will be described below with reference to FIG. 2.

Hereinafter, the AHBN, which is the first AHB bus, is referred to as a North AHB bus, and the AHBS, which is the second AHB bus, is referred to as a South AHB bus.

Referring to FIG. 2, the AMBA having the dual AHB bus system according to an exemplary embodiment of the present invention includes the global arbiter 202, the system control register block 201, and the AHB-to-AHB bridge 203, so that the master connected to the North AHB bus can access the South AHB bus or the master connected to the South AHB bus can access the North AHB bus. When there is a cross-access between buses, handshaking signals for performing the data transmission can be generated between the global arbiter 202 and the system control register block 201 based on the AHB-to-AHB protocol.

Figure 3:
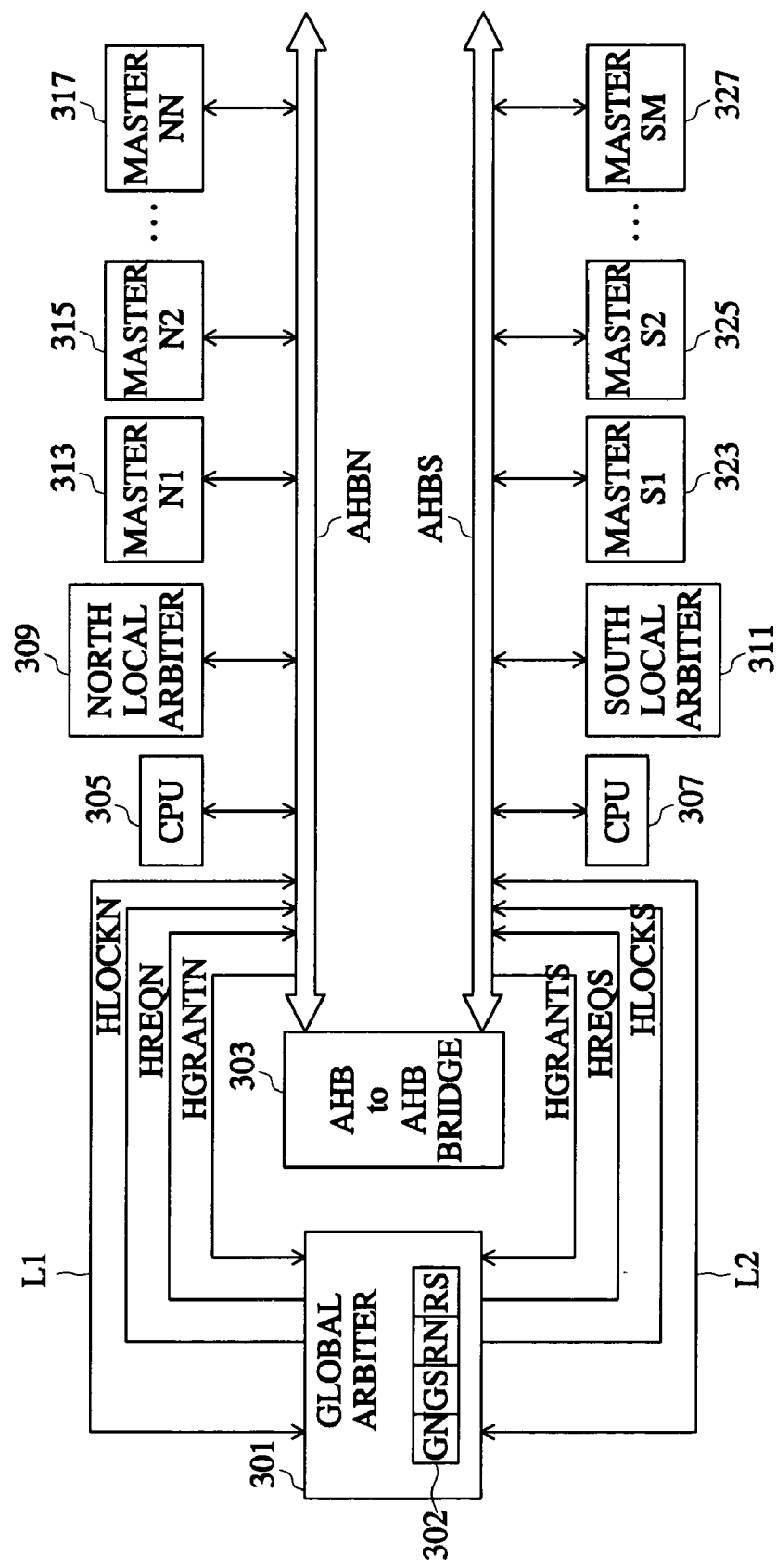
FIG. 3 is a simplified block diagram illustrating an AMBA having a dual AHB bus system in accordance with another exemplary embodiment of the present invention.

FIG. 3 is a simplified block diagram illustrating the AMBA having the dual AHB bus system according to an exemplary embodiment of the present invention.

The dual AHB bus system shown in FIG. 3 includes a first AHB bus (hereinafter, "AHBN"), a second AHB bus (hereinafter, "AHBS"), a global arbiter 301, a first CPU 305 connected to the AHBN, a first local arbiter 309 connected to the AHBN, master devices 313, 315, 317 connected to the AHBN, a second CPU 307 connected to the AHBS, a second local arbiter 311 connected to the AHBS, master devices 323, 325, 327 connected to the AHBS, and an AHB-to-AHB bus bridge 303 that may act as a bridge between the AHBN and the AHBS. The global arbiter 301 includes a register 302, which, for example, stores bus request signals, such as HREQN and HREQS, and bus grant signals, such as HGRANTN and HGRANTS. In FIG. 3, lines L1, L2 are used to send and receive addresses or data between the global arbiter 301 and each bus (i.e. AHBN, AHBS).

Referring to FIG. 3, the AMBA having the dual AHB bus system according to an exemplary embodiment of the present invention includes the global arbiter 301 and the AHB-to-AHB bus bridge 303, so that the master connected to the North AHB bus can access the South AHB bus, and the master connected to the South AHB bus can access the North AHB bus. When a cross-access occurs between the buses, the global arbiter 301 generates handshaking signals for performing the data transmission based on the AHB-to-AHB protocol.

As shown in FIG. 2, an exemplary embodiment of the present invention can enhance the system performance by implementing the dual AHB bus system. As the master devices and the slave devices are distributed into the North AHB bus and the South AHB bus, the load on the system bus can be reduced compared to the system having one AHB bus.

When no cross-access occurs between the North AHB bus and the South AHB bus in the dual AHB system each AHB bus constitutes the AMBA system with local arbiters 205, 210 and system resources (e.g. CPU 204, 209 and masters (206 to 208, 211 to 213)), which are independent in each bus, allowing each AHB bus to operate independently.

Therefore, an exemplary embodiment of the present invention can solve the bus sharing problem, which can be generated due to a master of a great amount of data transmission, by using the dual AHB system.

When the master connected to the North AHB bus accesses the South AHB bus or the master connected to the South AHB bus accesses the North AHB bus in the dual AHB system, the cross-access can be performed through the AHB-to-AHB bus bridge 203.

The protocol between the buses (i.e. AHBN and AHBS) in the AHB bus system according to the exemplary embodiment of the present invention can, optionally, use a software algorithm shown in Table 1. In general, the SWP (or Swap) instruction provides an indivisible read and write from memory. The SWP instruction swaps a byte or word between a register and a memory location rather than swapping between two registers. In Table 1, a SWP instruction is used for setting and clearing the system control register block. In Table 1, the system control register block, which is being accessed by one master of the South or the North, should not be accessed by the other master. Thus, in a multiple bus system, the SWP instruction may prevent or reduce the possibility of a deadlock situation where both North and South Masters are trying to access the same system control register block at the same time.

TABLE 1

| Software Setting in North to South Cross-Access | Software Setting in South to North Cross-Access |
| --- | --- |
| ① GHBUSREQ_AHBN_ SW setting (exemplary ARM processor code) C-code: __asm {    MOV r0, #(SCRBase +0x00)    ADD r0, r0, #0x20    LDR r1, [r0]    ADD r1, r1, #0x01    SWP r2, r1, [r0] } ---→ same as the ASM code | ① GHBUSREQ_AHBS_ SW setting (exemplary ARM processor code) C-code: __asm {    MOV r0, #(SCRBase +0x00)    LDR r1, [r0]    ADD r1, r1, #0x01    SWP r2, r1, [r0] } ---→ same as the ASM code |
| ② GHBUSGNT_AHBN polling (exemplary ARM processor code) C-code: While (GHBUSGNT_ AHBN == 0); ASM-code:    MOV r1,    #(GHBUSGNT_AHBN)    ADD r1, r1, #0x24    LDR r0, =0x01 001 LDR r2, [r1]    CMP r0, r2    BNE %B001 | ② GHBUSGNT_AHBN polling (exemplary ARM processor code) C-code: While (GHBUSGNT_ AHBN == 0); ASM-code:    MOV r1,    #(GHBUSGNT_AHBN)    ADD r1, r1, #0x18    LDR r0, =0x01 001 LDR r2, [r1]    CMP r0, r2    BNE %B001 |
| ③ Code to be executed ④ GHBUSREQ_AHBN_ SW setting (exemplary ARM processor code) C-code: __asm {    MOV r0, #(SCRBase +0x00)    ADD r0, r0, #0x20    LDR r1, [r0]    SUB r1, r1, #0x01    SWP r2, r1, [r0] } ---→ same as the ASM code | ③ Code to be executed ④ GHBUSREQ_AHBN_ SW setting (exemplary ARM processor code) C-code: __asm {    MOV r0, #(SCRBase +0x00)    LDR r1, [r0]    SUB r1, r1, #0x01    SWP r2, r1, [r0] } ---→ same as the ASM code |

Figure 4:
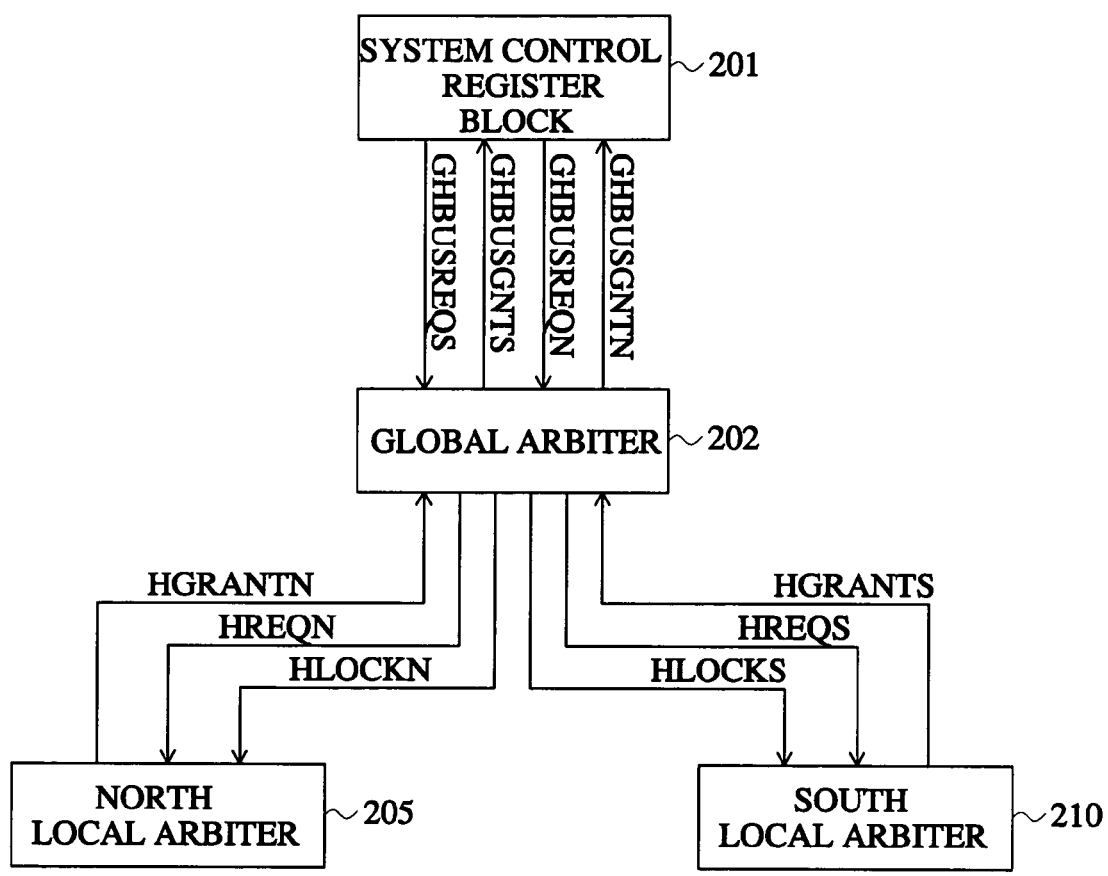
FIG. 4 is a block diagram illustrating the handshaking of signals between a system control register block and a global arbiter and between a global arbiter and a local arbiter, in accordance with another exemplary embodiment of the invention.

FIG. 4 is a block diagram illustrating handshaking of signals between the system control register block and the global arbiter and between the global arbiter and the local arbiter in accordance with another exemplary embodiment of the invention.

Referring to FIG. 4, the system control register block 201 receives bus request signals, such as GHBUSREQN, GHBUSREQS, from the masters connected to each AHB bus (not shown). The system control register block 201 may also receive the bus grant signals, such as GHBUSGNTN, GHBUSGNTS, from the global arbiter 202 to store information on each signal, and sends the bus request signals, such as GHBUSREQN, GHBUSREQS, to the global arbiter 202. The global arbiter 202 receives the bus request signals of the system control register block 201, such as GHBUSREQN, GHBUSREQS, and sends the bus grant signals, such as GHBUSGNTN, GHBUSGNTS, to the system control register block 201.

Further, the global arbiter 202 sends the bus request signal HREQN and the locking signal for bus arbitration HLOCKN to the first local arbiter 205, and receives the bus grant signal HGRANTN from the first local arbiter 205. Additionally, the global arbiter 202 sends the bus request signal HREQS and the locking signal for bus arbitration HLOCKS to the second local arbiter 210, and receives the bus grant signal HGRANTS from the second local arbiter 210. The first local arbiter 205, optionally, may send the request signals to each device (not shown) connected to the North AHB bus and receive the grant signals from each device, and the second local arbiter 210, optionally, may send the request signals to each device (not shown) connected to the South AHB bus and receive the grant signals from each device.

For example, when the master connected to the North AHB bus AHBN cross-accesses the South AHB bus AHBS, the master connected to the AHBN bus sets a GHBUSREQN bit of the system control register block 201, and polls the GHBUSGNTN bit of the system control register block 201. The global arbiter 202 receives information on the GHBUSREQN from the system control register block 201, thereby transmitting the HREQS signal to the South local arbiter 210 connected to the South AHB bus. Bus arbitration can occur in the South local arbiter 210. The South local arbiter 210 transmits the HGRANTS signal to the global arbiter 202, and the global arbiter 202 transmits the GHBUSGNTN signal to the system control register block 201. The GHBUSGNTN signal may be transmitted to a register map region (not shown) in the system control register block 201. While the master connected to the AHBN polls the GHBUSGNTN bit of the system control register block 201, if the bit is set, it starts data sending to the South AHB bus and data receiving from the South AHB bus.

After the data sending and receiving are completed, the master connected to the AHBN bus may clear the GHBUSREQN bit.

Similarly, when the master connected to the South AHB bus AHBS, cross-accesses the North AHB bus AHBN, the access can, optionally, be made in a manner as described above.

When one master (e.g., as a non-limiting example, the first CPU 204, MASTER N1, MASTER N2, . . . , or MASTER NN) connected to the North AHB bus AHBN, and the other master (e.g. the second CPU 209, MASTER S1, MASTER S2, . . . , or MASTER SM) connected to the South AHB bus AHBS cross-access at the same time, the system control register block 201 gives a priority to one of the masters to prevent or reduce the possibility of the buses being simultaneously granted, creating a dead lock condition. Then, while transmitting the data by the cross-access, the locking signals for bus arbitration, such as HLOCKN or HLOCKS, are generated to lock the bus arbitration. Therefore, the North AHB bus AHBN and the South AHB bus AHBS do not cross-access at the same time in the system control register block 201. Thus, the dead lock condition can be avoided.

Figure 5:
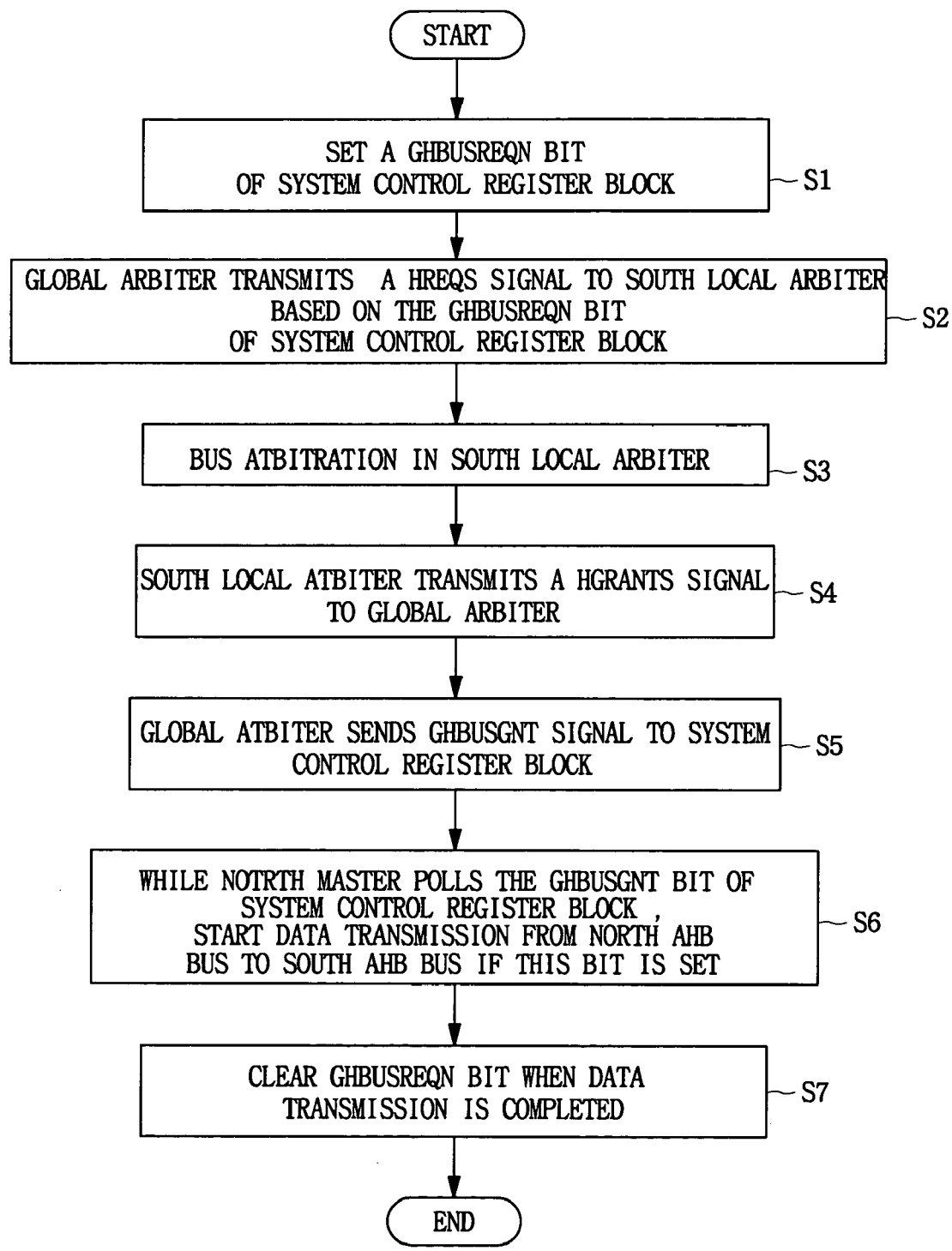
FIG. 5 is a flow chart illustrating a cross-access process between a first data bus and a second data bus, constituting the dual AHB bus in accordance with the exemplary embodiment of the present invention as shown in FIG. 2.

FIG. 5 is a flow chart illustrating a cross-access process between the first data bus and the second data bus, constituting the dual AHB bus in accordance with an exemplary embodiment of the present invention, describing the process that the master connected to the North AHB bus AHBN cross-accesses the South AHB bus AHBS.

As shown in FIG. 5, the process that the master connected to the North AHB bus AHBN cross-accesses the South AHB bus AHBS in the AHB bus system according to an exemplary embodiment of the present invention, includes the steps of, the first bus request signal GHBUSREQN of the system control register block is set by the master, such as a CPU connected to the North AHB bus (S1). The HREQS signal is transmitted to the South local arbiter based on the GHBUSREQN bit of the system control register block by the global arbiter (S2). A bus arbitration is then performed in the South local arbiter (S3). The HGRANTS signal is transmitted to the global arbiter by the South local arbiter (S4). Next, the GHBUSGNTN signal is transmitted to the system control register block by the global arbiter (S5). Data transmission from the North AHB bus to the South AHB bus starts if the GHBUSGNT bit is set, while the North master polls the GHBUSGNT bit of the system control register block (S6). Then clearing the GHBUSREQN bit when the data transmission is completed (S7).

Figure 6:
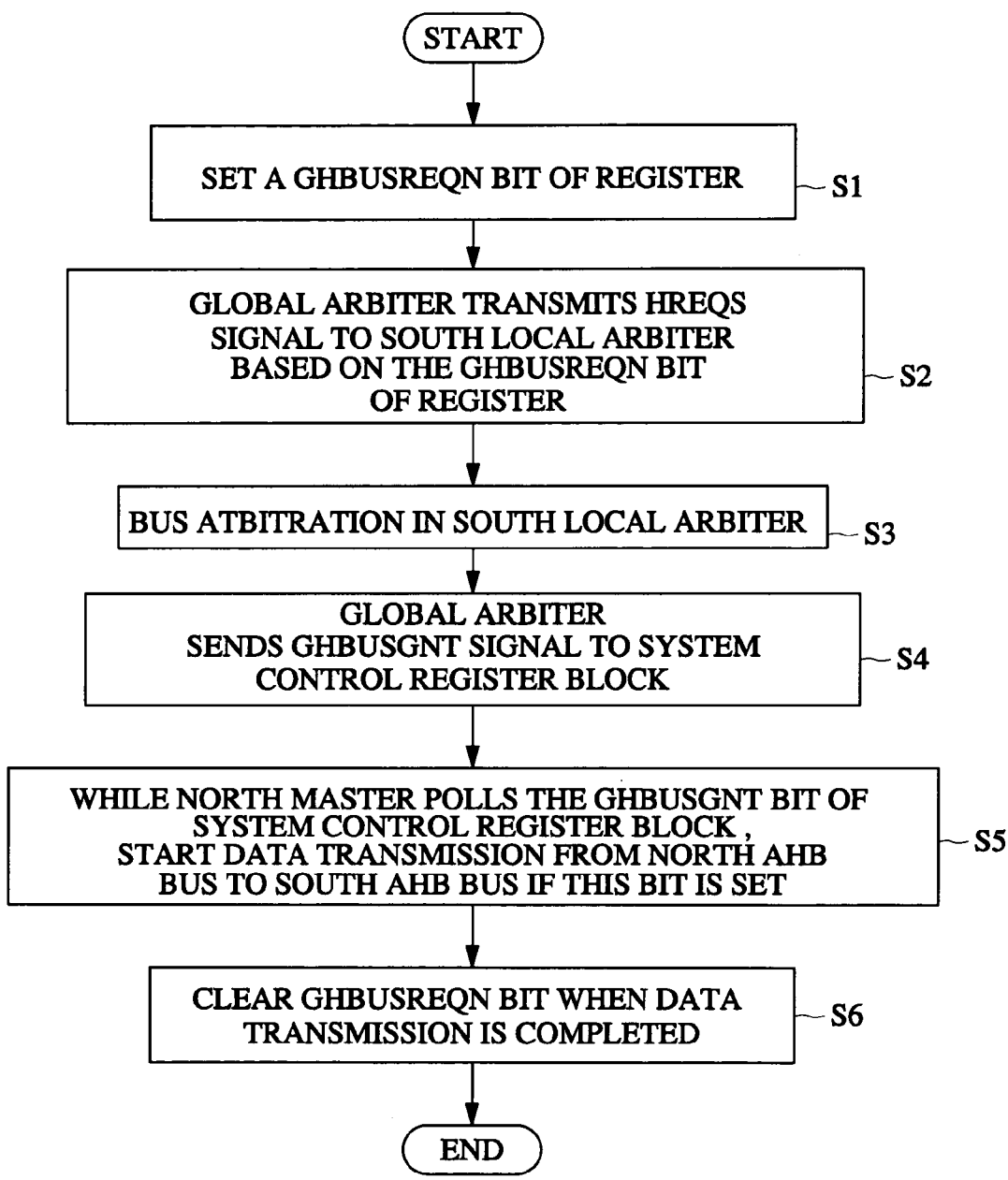
FIG. 6 is a flow chart illustrating a cross-access process between a first data bus and a second data bus, constituting the dual AHB bus in accordance with the exemplary embodiment of the present invention as shown in FIG. 3.

FIG. 6 is a flow chart illustrating the cross-access process between the first data bus and the second data bus. The dual AHB bus process demonstrates that the master connected to the North AHB bus AHBN cross-accesses the South AHB bus AHBS.

As shown in FIG. 6, the process that the master connected to the North AHB bus AHBN cross-accesses the South AHB bus AHBS in the AHB bus system according to the exemplary embodiment of the present invention, includes the steps of, the first bus request signal GHBUSREQN of the register implemented in the global arbiter being set by the master, such as CPU connected to the North AHB bus (S1). The HREQS signal is transmitted to the South local arbiter based on the GHBUSREQN bit of the register block by the global arbiter (S2). A bus arbitration is performed in the South local arbiter (S3). The HGRANTS signal is transmitted to the global arbiter by the South local arbiter (S4). A data transmission from the North AHB bus to the South AHB bus starts if the GHBUSGNT bit is set, while the North master polls the GHBUSGNT bit of the system control register block (S5). Lastly, the GHBUSREQN bit is cleared when the data transmission is completed (S6).

Figure 7:
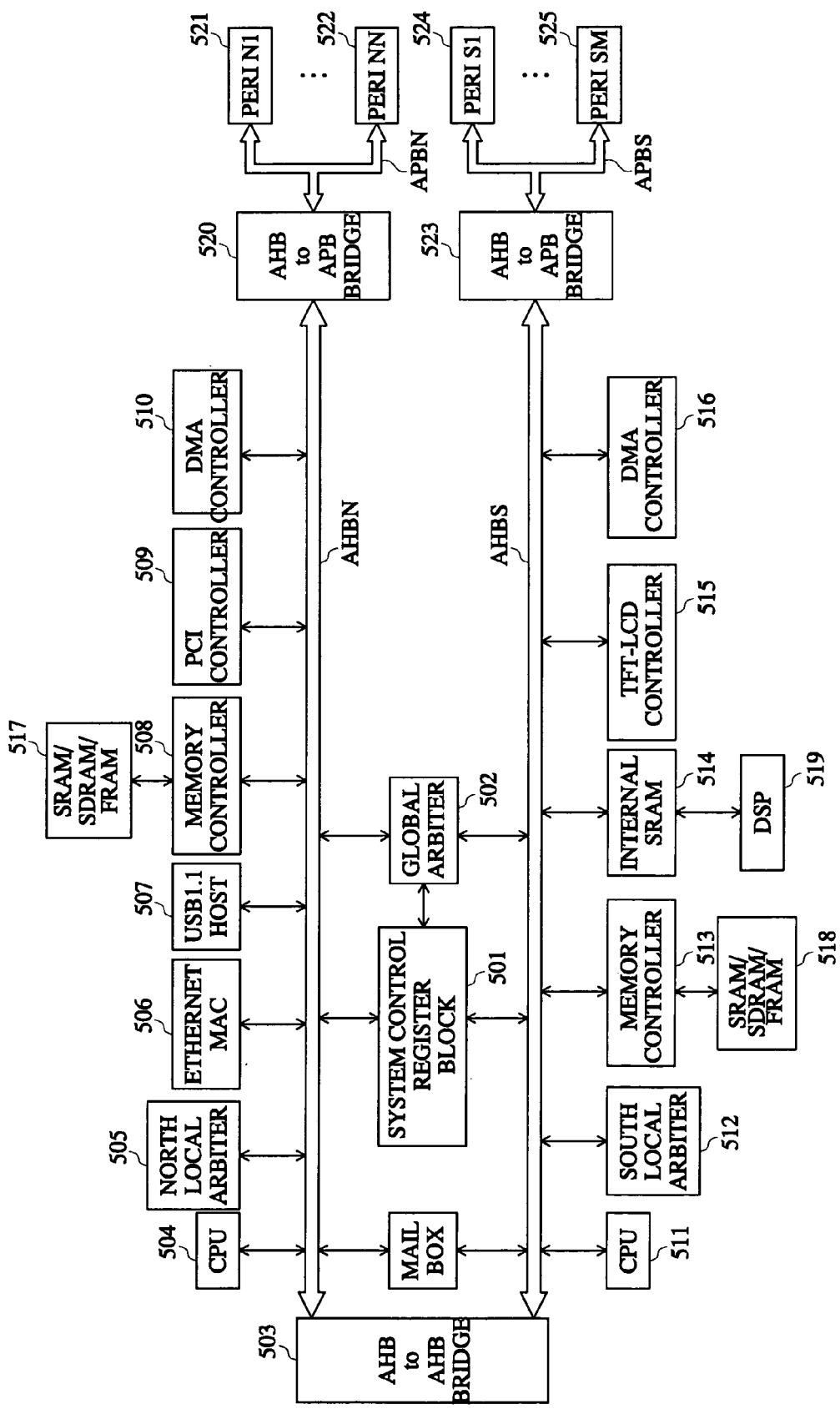
FIG. 7 is a simplified block diagram illustrating an AMBA having a dual AHB bus system in accordance with another exemplary embodiment of the present invention.

FIG. 7 is a block diagram illustrating the AMBA having the dual AHB bus system according to an exemplary embodiment of the present invention. The dual AHB bus system shown in FIG. 7 shows that AHB-to-APB bridges 520, 523 may optionally be connected to the dual AHB bus system of FIG. 2.

Referring to FIG. 7, the masters connected to the North AHB bus (i.e. 504, 506 to 510) may send and receive data with the low speed devices connected to a first Advanced Peripheral Bus (hereinafter, referred to as "APBN") through the AHB-to-APB bridge 520. Similarly, the masters connected to the South AHB bus (i.e. 511, 513 to 516) may send and receive data with the low speed devices connected to a second APB bus (hereinafter, referred to as "APBS") through the AHB-to-APB bridge 523. A CPU 504, an Ethernet MAC 506, a USB1.1 Host 507, a Memory Controller 508, a PCI Controller 509, a DMA Controller 510 as non-limiting examples may be the masters connected to the North AHB bus, whereas a CPU 511, a Memory Controller 513, an Internal SRAM 514, a TFT-LCD Controller 515, a DMA Controller 516 as non-limiting examples may be the masters connected to the South AHB bus. The Memory Controllers 508, 513 are connected Memory devices 517, 518, such as SRAM, SDRAM, and FRAM. The first APB bus APBN may be connected a plurality of peripheral devices 521 and 522, while to the second APB bus APBS may be connected a plurality of peripheral devices 524 and 525.

Figure 8:
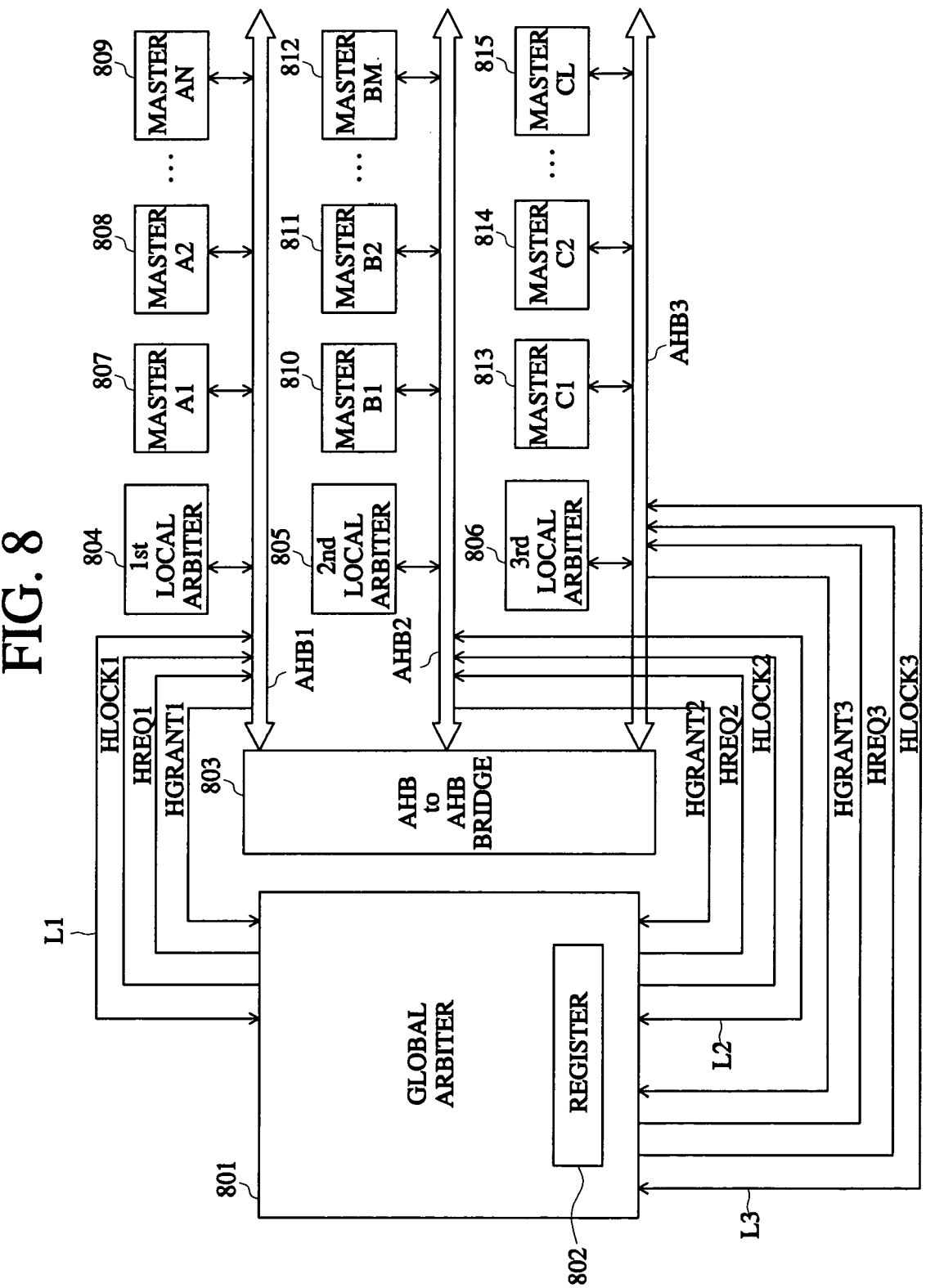
FIG. 8 is a simplified block diagram illustrating an AMBA having a multiple AHB bus system in accordance with an exemplary embodiment of the present invention.

FIG. 8 is a simplified block diagram illustrating the AMBA having a multiple AHB bus system in accordance with an exemplary embodiment of the present invention, that is, the AHB bus system having three data buses AHB1, AHB2, and AHB3. A global arbiter 801 of FIG. 8 includes a register 802 that stores the bus request signals (i.e. HREQ1, HREQ2 and HREQS3) and the bus grant signals (i.e. HGRANT1, HGRANT2 and HGRANT3). In FIG. 8, lines L1, L2, L3 are used to send and receive addresses or data between the global arbiter 801 and each bus (AHB1, AHB2 and AHB3), The multiple AHB bus system in FIG. 8 is similar in operation to the dual AHB bus system shown in FIG. 3, except that there are three data buses having the local arbiter and masters, and that there are bus request signals (i.e. HREQ1, HREQ2 and HREQ3), bus grant signals (i.e. HGRANT1, HGRANT2 and HGRANT3) and locking signals for bus arbitration (i.e. HLOCK1, HLOCK2 and HLOCK3), between the global arbiter and each data bus (i.e. AHB1, AHB2 and AHB3), respectively.

Although the exemplary embodiments of the present invention are described above, it will be appreciated by those of ordinary skill in the art that various changes and modifications can be made without departing from the spirit and scope of the invention as shown in the appended claims.

As described above, the data bus system according to the exemplary embodiment of the present invention can distribute the devices connected on the system bus, thereby increasing the operational speed and solving the bus-sharing problem, which occurs when the bus master performing a great amount of data transmission uses the bus, to enhance the system performance.

What is claimed is:

1. A data bus system comprising:
    a plurality of buses to which a plurality of devices including at least one master are connected and on which data can be transmitted among the plurality of devices, wherein the master can request and control the data transmission;
    a global arbiter that receives a first bus request signal to output a second bus request signal and receives a second bus grant signal to output a first bus grant signal;
    at least one bilateral bridge that transmits data between the plurality of buses; and
    a local arbiter exists in each of the plurality of buses, and receives the second bus request signal from the global arbiter to output the second bus grant signal.

2. The data bus system according to claim 1, wherein the data bus system is an AHB bus system.

3. The data bus system according to claim 1, wherein the system further comprises a register block stores the first bus request signal to transmit the global arbiter and the first bus grant signal received from the global arbiter.

4. The data bus system according to claim 3, wherein the register block receives the first bus request signal from one of the masters connected to one of the plurality of buses.

5. The data bus system according to claim 4, wherein the register block outputs the second bus request signal to one of the masters connected to another one of the plurality of buses.

6. The data bus system according to claim 1, wherein when no cross-access occurs between the plurality of buses, the plurality of buses are operable to independently and simultaneously transmit data.

7. The data bus system according to claim 1, wherein when a cross-access occurs between the plurality of buses, the at least one master device connected to one of the plurality of buses being operable to use another one of the plurality of buses.

8. The data bus system according to claim 3, wherein when the at least one master device connected to one of the plurality of buses accesses the register block simultaneously with bthe at least one master device of the plurality of buses, the register block gives a priority to one of the at least one master device.

9. The data bus system according to claim 1, wherein when a cross-access occurs between the plurality of buses, the global arbiter sends locking signals for bus arbitration to the local arbiter of the bus that requests the cross-access.

10. A data bus system comprising:
    first and second data buses to which a plurality of devices including at least one master are connected and on which data can be transmitted among the plurality of devices, wherein the master can request and control the data transmission;
    a global arbiter that receives a first bus request signal to output a second bus request signal and receives a second bus grant signal to output a first bus grant signal;
    a first bilateral bridge that transmits data between the first data bus and the second data bus;
    a local arbiter that receives the second bus request signal from the global arbiter to output the second bus grant signal;
    a third data bus to which a plurality of low speed devices are connected and on which data can be transmitted among the plurality of low speed devices; and
    a second bilateral bridge that acts as a data transmission path between the first data bus and the third data bus or between the second data bus and the third data bus.

11. The data bus system of claim 10, wherein the data bus system is an AHB bus system.

12. The data bus system of claim 10, wherein when no cross-access occurs between the first data bus and the second data bus, these two buses can independently transmit data at the same time.

13. A data bus system comprising:
    first and second data buses to which a plurality of devices including at least one master are connected and on which data can be transmitted among the plurality of devices, wherein the master can request and control data transmission;
    a global arbiter that receives a first bus request signal from the master of the first data bus and the second data bus to output a second bus request signal and receives a second bus grant signal to output a first bus grant signal;
    a bilateral bridge that transmits data between the first data bus and the second data bus; and
    a local arbiter that exists in each first and second data bus, and receives the second bus request signal from the global arbiter to output the second bus grant signal.

14. The data bus system according to claim 13, wherein the global arbiter includes a register that stores the first bus request signal and the first bus grant signal.

15. The data bus system according to claim 14, wherein the register receives the first bus request signal from one of the masters connected to the first or the second data bus.

16. The data bus system according to claim 14, wherein the register outputs the second bus request signal to one of the masters connected to the first or the second data bus.

17. The data bus system according to claim 13, wherein when a cross-access occurs between the first data bus and the second data bus, the global arbiter sends locking signals for bus arbitration to the local arbiter of the data bus that requests the cross-access.

18. A cross-access method between buses comprising:
sending a first bus request signal into a register block by a master connected to a first data bus;
transmitting a second bus request signal to a first local arbiter by a global arbiter based on the first bus request signal of the register block;
performing a bus arbitration in the first local arbiter;
transmitting a second bus grant signal to the global arbiter by the first local arbiter;
transmitting a first bus grant signal to the register block by the global arbiter;
starting data transmission from the first data bus to a second data bus if the first grant signal is set while the first bus grant signal of the register block is being polled by the master connected to the first data bus; and
clearing the first bus request signal when the cross-access is terminated.

19. A data bus system comprising:
N data buses to which a plurality of devices including at least one master are connected and on which data can be transmitted among the plurality of devices, wherein the master can request and control the data transmission;
global arbiter means for receiving a first bus request signal from the register blocks to output a second request signal and receiving a second bus grant signal to output a first bus grant signal;
bridging means for creating data transmission between the N buses; and
local arbiter means for receiving the second bus request signal from the global arbiter means to output the second bus grant signal.

20. A data bus system comprising:
first and second data buses to which a plurality of devices including at least one master are connected and on which data can be transmitted among the plurality of devices, wherein the master can request and control the data transmission;
a global arbiter means for receiving a first bus request signal to output a second bus request signal and receiving a second bus grant signal to output a first bus grant signal;
a first bridging means for transmitting data between the first data bus and the second data bus;
a local arbiter means for receiving the second bus request signal from the global arbiter to output the second bus grant signal;
a third data bus to which a plurality of low speed devices are connected and on which data can be transmitted among the plurality of low speed devices; and
a second bridging means for transmitting between the first data bus and the third data bus or between the second data bus and the third data bus.

* * * * *